United States Patent
Kim et al.

(10) Patent No.: US 11,960,084 B2
(45) Date of Patent: Apr. 16, 2024

(54) OPTICAL ASSEMBLY AND ELECTRONIC DEVICE COMPRISING SAME

(71) Applicant: Samsung Electronics Co., Ltd., Gyeonggi-do (KR)

(72) Inventors: Youngran Kim, Gyeonggi-do (KR); Soojung Kim, Gyeonggi-do (KR); Yongsu Kim, Gyeonggi-do (KR); Cheongsoo Park, Gyeonggi-do (KR); Hwanseon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 742 days.

(21) Appl. No.: 16/972,084

(22) PCT Filed: Jun. 5, 2019

(86) PCT No.: PCT/KR2019/006776
§ 371 (c)(1),
(2) Date: Dec. 4, 2020

(87) PCT Pub. No.: WO2019/235837
PCT Pub. Date: Dec. 12, 2019

(65) Prior Publication Data
US 2021/0223550 A1    Jul. 22, 2021

(30) Foreign Application Priority Data
Jun. 5, 2018  (KR) .................. 10-2018-0065087

(51) Int. Cl.
*G02B 27/01*    (2006.01)
*G02B 1/11*     (2015.01)
(Continued)

(52) U.S. Cl.
CPC ............ *G02B 27/0172* (2013.01); *G02B 1/11* (2013.01); *G02B 3/04* (2013.01); *G02B 5/10* (2013.01)

(58) Field of Classification Search
CPC .... G02B 27/09; G02B 27/017; G02B 27/095; G02B 27/0977; G02B 27/0172;
(Continued)

(56) References Cited

U.S. PATENT DOCUMENTS 6,392,811 B1   5/2002   Lindau
7,095,562 B1 * 8/2006   Peng .................. G02B 27/0101
                                                    359/290
(Continued)

FOREIGN PATENT DOCUMENTS

EP          3274758 B1    12/2022
KR   10-2001-0052707 A     6/2001
(Continued)

OTHER PUBLICATIONS

Decision to Refuse dated Jun. 23, 2023.
International Search Report dated Sep. 11, 2019.
Korean Office Action dated Jan. 20, 2023.

*Primary Examiner* — Sultan Chowdhury
(74) *Attorney, Agent, or Firm* — Cha & Reiter, LLC (57) ABSTRACT

Provided are an optical assembly and an electronic apparatus having the optical assembly.
The optical assembly includes at least one reflective mirror reflecting image light output form a display module, a refractive lens through which image light reflected from the at least one reflective mirror passes, and a reflective lens having a first surface and a second surface and including a transflective coating layer provided on the first surface and reflecting the image light that passed through the refractive (Continued)

lens in a first direction and transmitting real light from a second direction facing the first direction.

14 Claims, 7 Drawing Sheets

(51) Int. Cl.
  *G02B 3/04* (2006.01)
  *G02B 5/10* (2006.01)
(58) Field of Classification Search
  CPC ............ G02B 27/0178; G02B 27/0012; G02B 27/0024; G02B 27/0025; G02B 27/0026; G02B 27/283; G02B 27/1026; G02B 3/02; G02B 3/04; G02B 3/06; G02B 3/14; G02B 1/041; G02B 1/10; G02B 1/11; G02B 1/115; G02B 5/0284; G02B 5/0289; G02B 5/08; G02B 5/085; G02B 5/0883; G02B 5/12; G02B 5/124
  See application file for complete search history.

(56) References Cited

U.S. PATENT DOCUMENTS

| | | | | |
|---|---|---|---|---|
| 8,403,502 | B2* | 3/2013 | Oren | G09B 9/32 353/77 |
| 9,250,444 | B2 | 2/2016 | Magyari | |
| 9,958,676 | B2* | 5/2018 | Chou | H04N 9/3129 |
| 2005/0264502 | A1 | 12/2005 | Sprague et al. | |
| 2006/0152821 | A1* | 7/2006 | Takahashi | G02B 17/0832 359/726 |
| 2010/0245784 | A1* | 9/2010 | Nishikawa | G02B 17/08 359/730 |
| 2015/0168730 | A1* | 6/2015 | Ashkenazi | G02B 27/0176 359/630 |
| 2016/0195723 | A1 | 7/2016 | Murray et al. | |
| 2017/0023790 | A1* | 1/2017 | Border | G02B 27/283 |
| 2017/0269366 | A1 | 9/2017 | Lee et al. | |
| 2018/0035103 | A1 | 2/2018 | Sung et al. | |
| 2018/0107000 | A1 | 4/2018 | Sung et al. | |
| 2019/0064524 | A1* | 2/2019 | Cobb | G02B 1/11 |
| 2022/0082843 | A1 | 3/2022 | Magyari | |

FOREIGN PATENT DOCUMENTS

| | | |
|---|---|---|
| KR | 10-2015-0024580 A | 3/2015 |
| KR | 10-2016-0005681 A | 1/2016 |
| KR | 10-2016-0050791 A | 5/2016 |
| KR | 10-2017-0107750 A | 9/2017 |
| KR | 10-2017-0129773 A | 11/2017 |
| KR | 10-2018-0012057 A | 2/2018 |
| KR | 10-2018-0043072 A | 4/2018 |

* cited by examiner

OPTICAL ASSEMBLY AND ELECTRONIC DEVICE COMPRISING SAME

CROSS-REFERENCE TO RELATED APPLICATION(S)

This application is a National Phase Entry of PCT International Application No. PCT/KR2019/006776, which was filed on Jun. 5, 2019 and claims priority to Korean Patent Application No. 10-2018-0065087, which was filed on Jun. 5, 2018, the contents of which are incorporated herein by reference.

TECHNICAL FIELD

Various embodiments relate to an optical assembly and an electronic apparatus having the same, and more particularly, to an optical assembly which is compact and has superior optical performance, and an electronic apparatus having the optical assembly.

BACKGROUND ART

Recently, product development related to augmented reality (AR) systems is actively conducted. As products used for the military in the past have been applied to games, industrial applications, medical applications, automobiles, mobile phones, and the like, small and light-weighted products with good image quality are required. However, due to the use of many lenses to obtain images of good quality, it is difficult to configure a productive and compact system.

Head-mounted displays (HMDs) refer to various digital devices capable of providing multimedia contents by wearing a glasses-type display on the head. According to the trend of lightening and miniaturization of digital devices, various wearable computers have been developed, and HMDs also are widely used. Beyond a simple display function, HMDs may provide various convenient functions to a user by being combined with AR technology, N screen technology, and the like.

DESCRIPTION OF EMBODIMENTS

Technical Problem

Various embodiments may provide an optical assembly which is compact and has superior optical performance in an electronic apparatus, for example, a head-mounted electronic apparatus.

Furthermore, various embodiments may provide an electronic apparatus including, for example, an optical assembly.

Solution to Problem

According to an embodiment, an optical assembly includes a first reflective mirror configured to reflect image light output from a display module, a second reflective mirror configured to reflect the image light reflected from the first reflective mirror, a refractive lens configured to allow the image light reflected from the second reflective mirror to pass therethrough, and a reflective lens having a first surface and a second surface, each of the first surface and the second surface having an asymmetrical aspherical shape, and the reflective lens including a transflective coating layer provided on the first surface and configured to reflect the image light that passed through the refractive lens in a first direction and to transmit real light from a second direction facing the first direction.

An anti-reflection coating layer may be further provided on the second surface of the reflective lens.

The first surface and the second surface of the reflective lens may have a same radius of curvature.

The first reflective mirror may have an asymmetrical aspherical shape.

The second reflective mirror may have an asymmetrical aspherical shape.

Each of the first reflective mirror and the second reflective mirror may have an asymmetrical aspherical shape.

The optical assembly may have four or more asymmetrical aspherical surfaces.

When an axis perpendicular to the display module is a Z-axis, and two axes perpendicular to the Z-axis are an X-axis and a Y-axis, the four or more asymmetrical aspherical surfaces may be configured such that an X-Z plane is asymmetrical with respect to the Y-axis and a Y-Z plane is symmetrical with respect to the X-axis.

A stop may be further provided in the first direction from the reflective lens.

A straight distance T3 between a center of an entrance pupil and a center of the display module of the optical assembly may have a range that 27 mm<T3<35 mm.

The optical assembly may satisfy a following inequality:

$$1.8 < (M1_{EFY})/EF_Y < 2.2, \qquad \text{<Inequality>}$$

wherein $M1_{EFY}$ denotes a focal length of the first reflective mirror, and $EF_Y$ denotes a focal length in the Y-axis of the optical assembly.

The optical assembly may satisfy a following inequality:

$$19 \text{ deg} < M1_{tilt} < 23 \text{ deg}, \qquad \text{<Inequality>}$$

wherein $M1_{tilt}$ denotes a tilt angle of the first reflective mirror with respect to the X-axis in the X-Z plane.

The optical assembly may satisfy a following inequality $$0.997 < EF_Y/EF_X < 1.003, \qquad \text{<Inequality>}$$

wherein $EF_Y$ denotes a focal length in the Y-axis of the optical assembly, and $EF_X$ denotes a focal length in the X-axis of the optical assembly.

According to another embodiment, an electronic apparatus includes a housing a display module mounted on one surface of the housing, a first reflective mirror configured to reflect image light output from the display module and arranged to face the display module, a second reflective mirror configured to reflect the image light reflected from the first reflective mirror and arranged below the display module, a refractive lens arranged to allow the image light reflected from the second reflective mirror to pass therethrough, and a reflective lens configured to reflect the image light that passed through the refractive lens in a user's eye direction and having a transflective coating layer configured to transmit external real light, wherein one or more of both surfaces has an asymmetrical aspherical shape, wherein the refractive lens is arranged from a lower end portion of the first reflective mirror to a lower end portion of the second reflective mirror, and the reflective lens is arranged below the refractive lens.

The electronic apparatus may further include a cover arranged to cover the first reflective mirror and the reflective lens.

Advantageous Effects of Disclosure

An optical assembly according to various embodiments may be compact and may provide a high quality image. An electronic apparatus according to various embodiments is worn on a user's head, and an image generated from a display module and an actual image from the outside are shown together.

MODE OF DISCLOSURE

Various embodiments of the disclosure will now be described more fully with reference to the accompanying drawings. An electronic apparatus according to various embodiments of the disclosure may include various type of apparatuses. The electronic apparatus may include at least one of, for example, a portable communication device, e.g., a smartphone, a computer device, a portable multimedia device, a portable medical device, a camera, a wearable device, or a home appliance. An electronic apparatus according to an embodiment of the disclosure is not limited to the above-described apparatuses.

Various embodiments of the disclosure will be described with reference to the accompanying drawings. However, it should be understood that the disclosure is not limited to these particular embodiments but also includes various modifications, equivalents, and/or alternatives thereof. Throughout the specification and drawings, like reference numerals may be used to denote like elements or components. Singular forms may include plural forms as well, unless the context clearly indicates otherwise. In the specification, the expressions such as "A or B," "at least one of A and/or B," "A, B or C," or "at least one of A, B and/or C" may include all available combinations of items listed together. Terms such as "first" and "second" are used herein merely to describe a variety of constituent elements regardless of an order and/or importance and to distinguish one constituent element from another constituent element, but the constituent elements are not limited by the terms. It will be understood that when a component (e.g., a first component) is referred to as being "(operatively or communicatively) coupled to/with" or "connected to/with" another component (e.g., a second component), it may be coupled to/with or connected to/with the other component directly or indirectly through one or more other components (e.g., third components).

The term "module" used in various embodiments of the disclosure may denote a unit including one or two or more combinations of, for example, hardware, software, or firmware. The module may be interchangeably used with terms, for example, units, logics, logical blocks, components, or circuits. The module may be a minimum unit of a part that is integrally formed or a part thereof. The module may be a minimum unit performing one or more functions or a part thereof. For example, the module may include an application-specific integrated circuit (ASIC).

Various embodiments of the disclosure may be implemented by software, for example, a program 240, including instructions stored in a machine- (e.g., a computer-) readable storage media, e.g., an internal memory 236 or an external memory 238. The machine is capable of calling the instructions stored in a storage medium and operating according to the called instructions, and may include an electronic apparatus, e.g., an electronic apparatus 201, according to the disclosed embodiments. When the instructions are executed by a processor, e.g., a processor 220, the processor may perform functions corresponding to the instructions directly or by using other constituent elements under the control of the processor. The instructions may include codes generated or executed by a compiler or an interpreter. The machine-readable storage medium may be provided in the form of a non-transitory storage medium. The "non-transitory" may merely mean that a storage medium does not include a signal, but is tangible, and may not distinguish whether data is stored in the storage medium semi-permanently or temporarily.

According to an embodiment, the method according to various embodiments of the disclosure may be provided by being included in a computer program product. The computer program product may be traded, as a product, between sellers and buyers. The computer program product may be distributed in the form of a machine-readable storage medium, e.g., a compact disc read-only memory (CD-ROM), or online through an application store, e.g., PlayStore™. For an online distribution, at least part of a computer program product may be at least temporarily stored in a storage medium such as a manufacturer's server, an application store' server, or a relay server' memory, or temporarily generated.

Each of constituent elements according to various embodiments, e.g., a module or a program, may include a single object or a plurality of objects, and some sub-constituent elements of the above-described sub-constituent elements may be omitted, or other sub-constituent elements may be further included in various embodiments. Alternatively or additionally, some constituent elements, e.g., a module or a program, are integrated into one object, a function performed by a corresponding constituent element before integration may be performed in an identical or similar manner. According to various embodiments, operations performed by a module, a program, or other constituent element may be sequentially, parallel, repetitively, or heuristically performed, and at least some operations may be performed in a different order, omitted, or other operations may be added.

Hereinafter, an optical assembly according to various embodiments, and an electronic apparatus having the same are described with reference to the accompanying drawings. In the specification, a term "user" may refer to a person using an electronic apparatus or an apparatus using an electronic apparatus, e.g., an artificial intelligence electronic apparatus.

Figure 1:
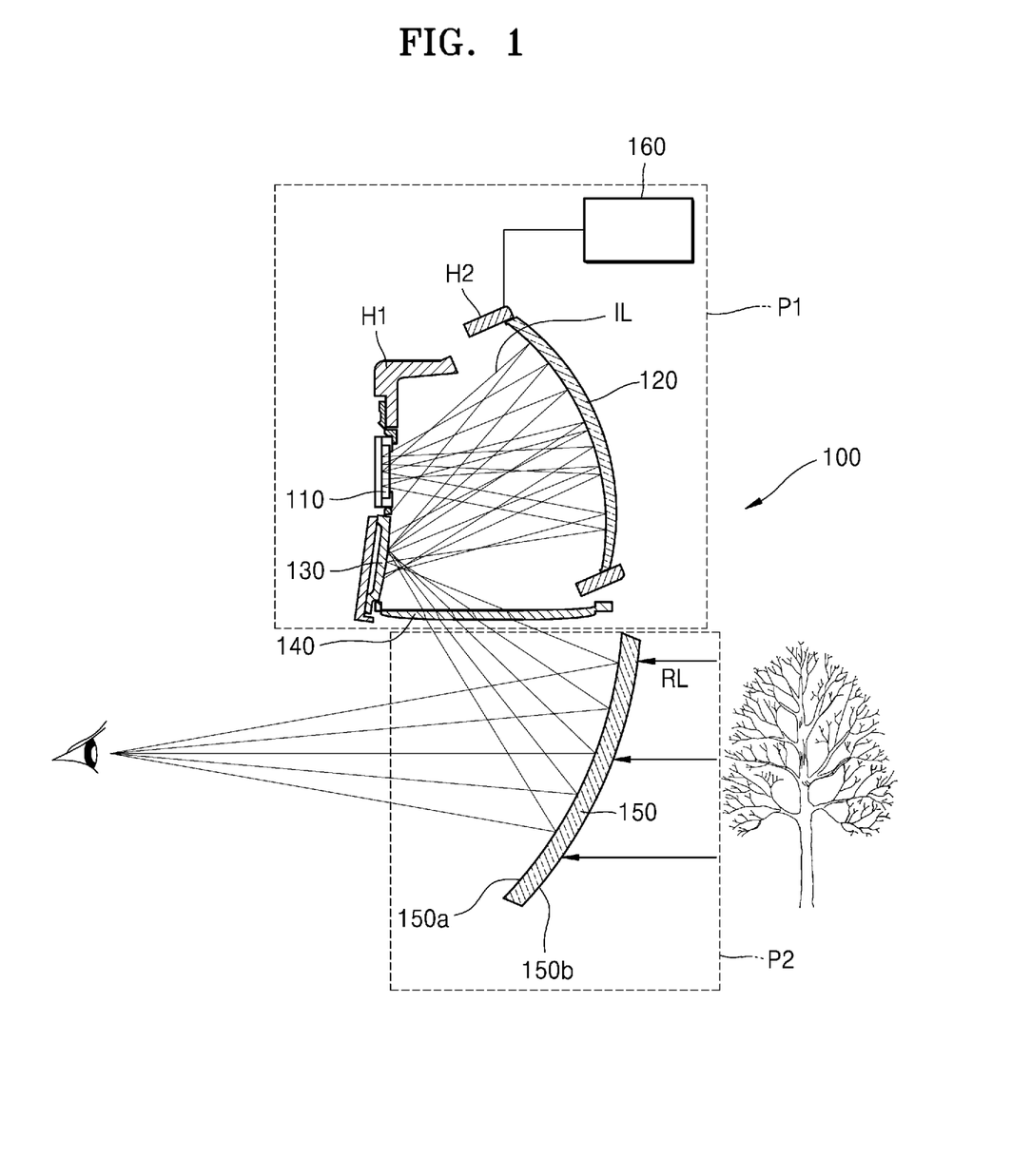
FIG. 1 schematically illustrates an electronic apparatus, according to an embodiment.
Figure 2:
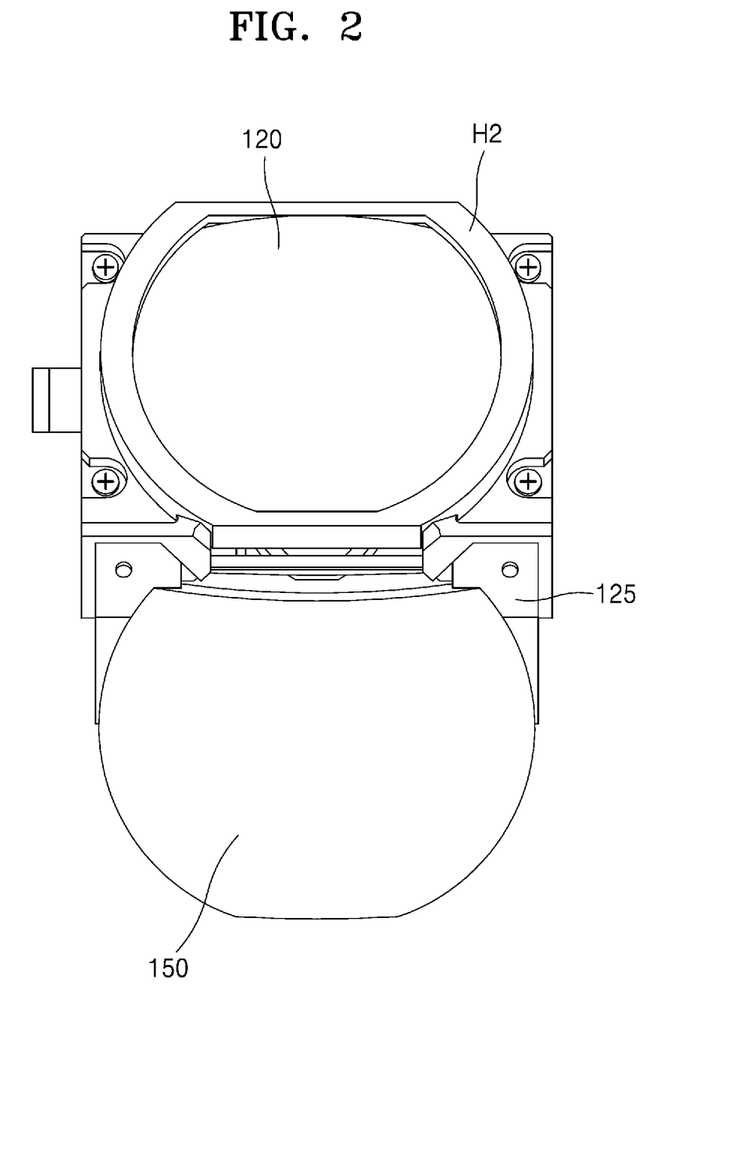
FIG. 2 is a front view of the exterior of an electronic apparatus, according to an embodiment.

FIG. 1 is a cross-sectional view of an electronic apparatus 100 according to an embodiment, and FIG. 2 is a front view of an exterior thereof. FIGS. 1 and 2 illustrate a part corresponding to a user's single eye, and such a device is mounted on each of both eyes of a user.

The electronic apparatus 100 according to various embodiments may include a first housing H1, a display module 110 mounted on one surface of the first housing H1, a first reflective mirror 120 reflecting image light output from the display module 110, and a second reflective mirror 130 reflecting image light reflected from the first reflective mirror 120. The first reflective mirror 120 may be arranged to face the display module 110. The first reflective mirror 120 may be mounted on a second housing H2. The first housing H1 and the second housing H2 may be provided as separate bodies. Alternatively, the first housing H1 and the second housing H2 may be provided as one body. The first housing H1 may be provided to allow a user to wear the electronic apparatus 100. For example, the first housing H1 may have a structure to allow a user to wear the electronic apparatus 100 on the face. A face wearable structure may be variously changed, for example, a helmet structure, a glasses structure, and the like.

The second reflective mirror 130 may be disposed on the same surface of the first housing H1. For example, the second reflective mirror 130 may be disposed under the display module 110. A reflective lens 150 reflecting image light reflected from the second reflective mirror 130 may be provided, and between the second reflective mirror 130 and a refractive lens 140 may be provided on an optical path of the reflective lens 150.

The refractive lens 140 may be disposed across from a lower end portion of the first reflective mirror 120 to a lower end portion of the second reflective mirror 130. The refractive lens 140 may be disposed in contact of, or adjacent to, the first reflective mirror 120 and the lower end portion of the second reflective mirror 130.

The electronic apparatus 100 may include a first part P1 located at an upper side and a second part P2 located at a lower side, with respect to the refractive lens 140. When a user wear the electronic apparatus 100, the first part P1 may be locate above a user's eye, the second part P2 may be located to face the user's eye.

The display module 110, the first reflective mirror 120, and the second reflective mirror 130 may be arranged in the first part P1, and the reflective lens 150 may be arranged in the second part P2. The refractive lens 140 may correct aberration to increase optical performance of the electronic apparatus 100. Furthermore, as the refractive lens 140 is disposed across from the lower end portion of the first reflective mirror 120 to the lower end portion of the second reflective mirror 130, the refractive lens 140 may function as a part of a housing like the first housing H1 and the second housing H2. In other words, as the refractive lens 140 is disposed on a boundary between the first part P1 and the second part P2 to thus reduce intrusion of external dust or impurities into the display module 110, the first reflective mirror 120, or the second reflective mirror 130. The refractive lens 140 may perform a performance correction function due to size reduction and protect the first reflective mirror 120 and the second reflective mirror 130 from foreign materials and external shock.

Figure 3:
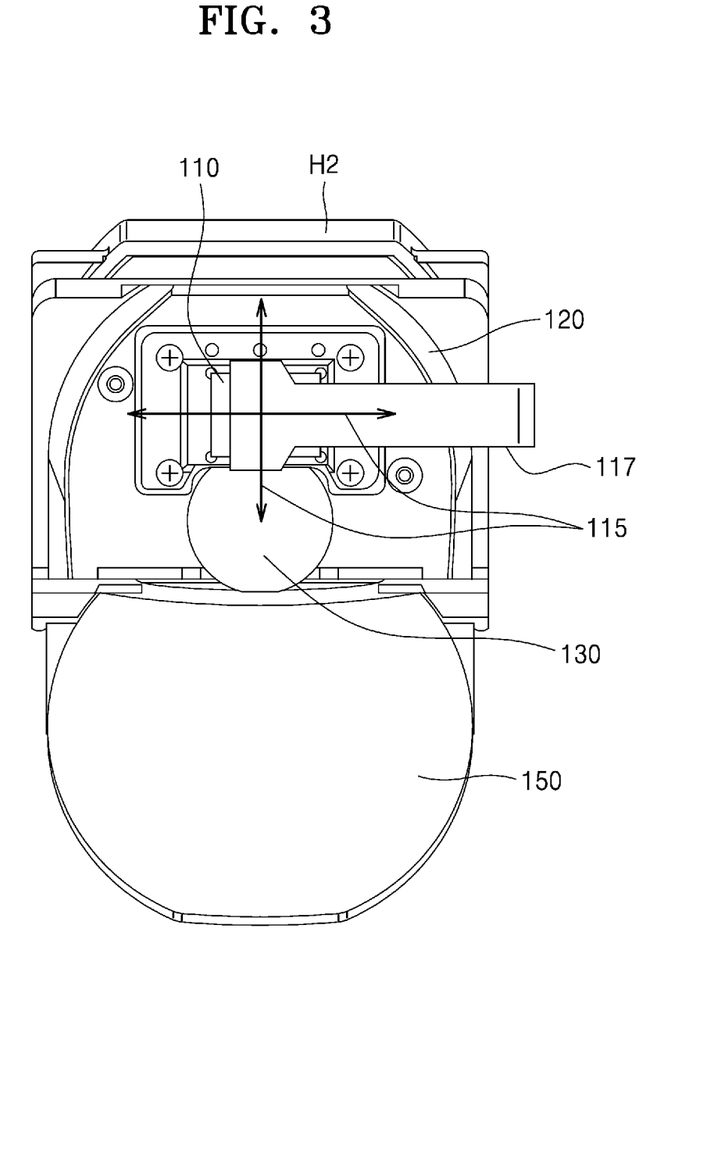
FIG. 3 is a front view of the interior of an electronic apparatus, according to an embodiment.

To overlap a left eye image generated from a display module for left eye with a right image generated from a display module for right eye at a particular distance, the display module 110 may be movably mounted in the first housing H1. Referring to FIG. 3, the display module 110 may be decentered by a holder 117 in X-axis and Y-axis directions 115. This is to improve a phenomenon that is generated due to errors in the mechanism and lens of an electronic apparatus and in that a virtual image overlaps. The display module 110 is movable within a range in which an image is not covered on each reflective surface.

Figure 4:
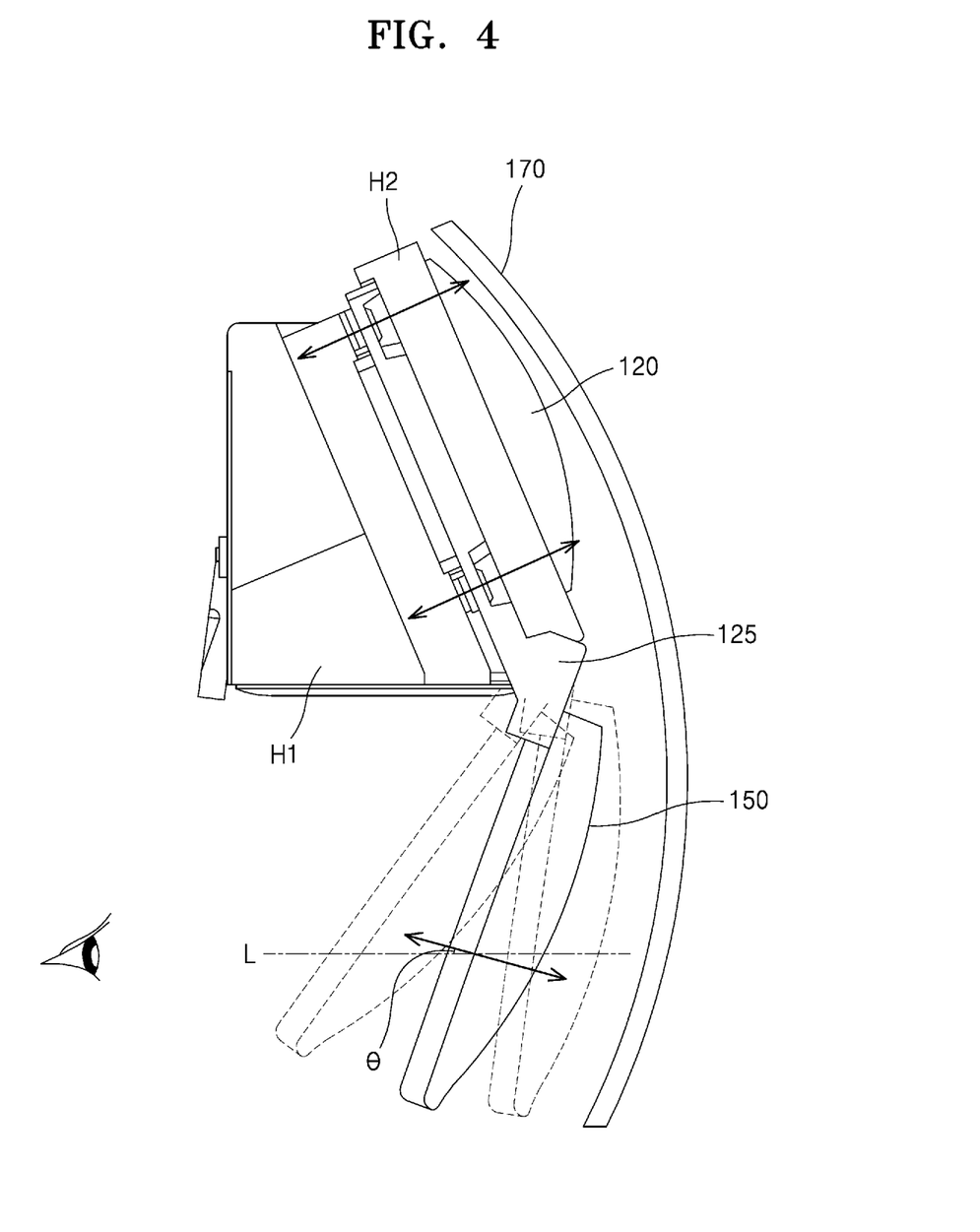
FIG. 4 illustrates an operation of an electronic apparatus, according to an embodiment.

FIG. 4 illustrates an operation of the first reflective mirror 120. The first reflective mirror 120 may be disposed in the second housing H2, and the first reflective mirror 120 may be variable. As illustrated in FIG. 1, a tilt adjustment portion 160 may be further provided to move the first reflective mirror 120. The first reflective mirror 120 and the reflective lens 150 may be coupled to each other such that the reflective lens 150 is moved in association with the movement of the first reflective mirror 120. The tilt of the reflective lens 150 may be adjusted to adjust a convergence angle by reflecting a feature that a person's line of vision generally directs downward. During mounting of the display module 110, the tilt of the reflective lens 150 may be adjusted by adjusting an interval between the first housing H1 and the second housing H2. As the reflective lens 150 is made to have a tilt angel θ of about 15° in a downward direction with respect to a person's eye, a virtual image may be adjusted to be located at a position where a line of vision is made comfortable. The tilt angle θ indicates an angle at which the reflective lens 150 is inclined with respect to a horizontal line L on the drawing.

Figure 5:
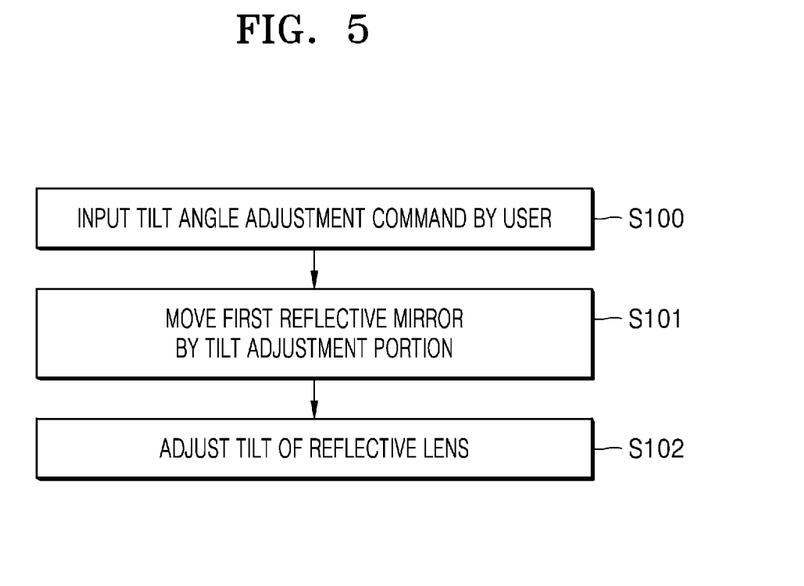
FIG. 5 illustrates a method of adjusting a tilt of a reflective lens included in an electronic apparatus, according to an embodiment.

The tilt of the reflective lens 150 may be adjusted in various methods. FIG. 5 illustrates a method of adjusting the tilt of the reflective lens 150. When a user wears the electronic apparatus 100 and a user's field of vision is inconvenient, a tilt angle adjustment command may be input to the electronic apparatus 100 (S100). Alternatively, the tilt angle of the reflective lens 150 may be adjusted for optical path adjustment in a manufacturing process of the electronic apparatus 100. The electronic apparatus 100 may move the first reflective mirror 120 by the tilt adjustment portion 160 (S101). The tilt of the reflective lens 150 may be adjusted in association with the first reflective mirror 120. A structure in which the reflective lens 150 moves in association with the movement of the first reflective mirror 120 is described. However, it may be possible that the tilt adjustment portion 160 directly adjusts the tilt of the reflective lens 150. Furthermore, it may be possible that the tilt of the reflective lens 150 is adjusted automatically or manually by a user.

As illustrated in FIG. 4, a cover 170 covering the first reflective mirror 120 and the reflective lens 150 may be further provided in the front side of the electronic apparatus 100. The cover 170 may include a transparent material. The cover 170 may be possible to adjust brightness, and may protect the first reflective mirror 120 and the reflective lens 150. Although FIG. 4 illustrates an example in which the cover 170 entirely covers from the first reflective mirror 120 to the reflective lens 150, the cover 170 may be changed in various ways. For example, the cover 170 may be configured to cover only the reflective lens 150.

Figure 6:
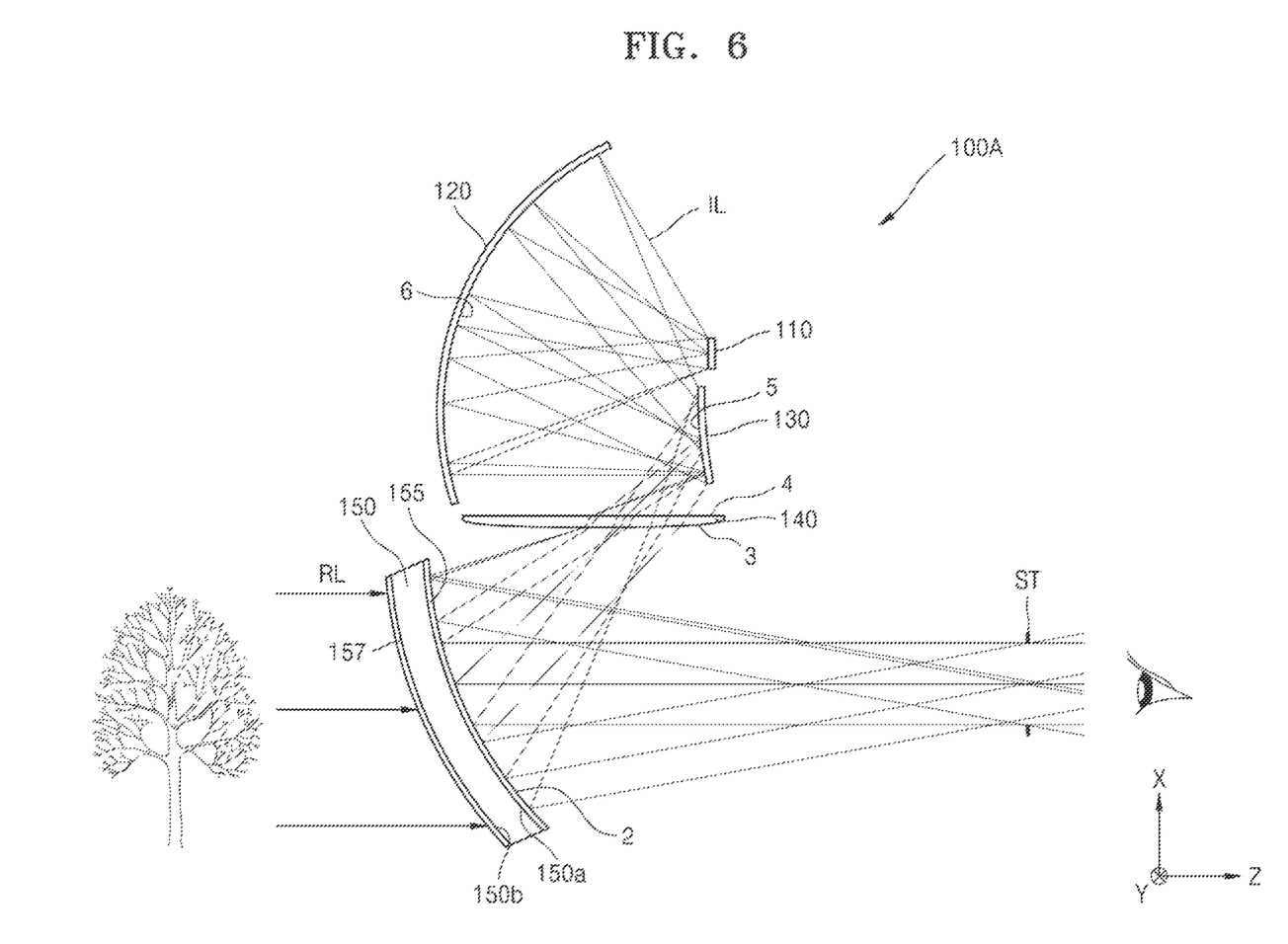
FIG. 6 illustrates an optical assembly, according to an embodiment.

FIG. 6 illustrates an optical assembly according to an embodiment. Constituent elements of the optical assembly use the same reference numerals as those in FIG. 1.

The reflective lens 150 may include a transflective coating layer 155 configured to reflect image light IL reflected from the second reflective mirror 130 to a user's eye and also transmit external real light RL. The transflective coating layer 155 may transmit part of incident light and reflect the other. Accordingly, as part of image light is reflected to a user's eye, an image generated from the display module 110 may be seen, and as part of real light input in a direction opposite to the reflective lens 150 is transmitted so that a real object may be seen with an image. The transflective coating layer 155 may have a reflexibility of, for example, 50%. The reflexibility is merely an example, and the disclosure is not limited thereto. The transflective coating layer 155 may be provided on a first surface 150*a* of the reflective lens 150. The first surface 150*a* may indicate a surface facing the user's eye when a user wears the electronic apparatus 100A.

An anti-reflection coating layer 157 may be further provided on a second surface 150b of the reflective lens 150. The second surface 150b may be a surface opposite to the first surface 150a. The anti-reflection coating layer 157 may be configured as a multilayer. The anti-reflection coating layer 157 is to reduce reflection of light when external light is incident on the reflective lens 150. Accordingly, an external real object may be seen well. The reflective lens 150 may be an asymmetrical aspherical lens. The first surface 150a and the second surface 150b of the reflective lens 150 each may be aspherical asymmetrical surfaces. An axis perpendicular to the display module 110 is a Z-axis, and two axes perpendicular to the Z-axis are the X-axis and the Y-axis. The first surface 150a and the second surface 150b may be configured such that an X-Z plane is asymmetrical with respect to the Y-axis and a Y-Z plane is symmetrical with respect to the X-axis. As the Y-Z plane is symmetrical, it may be advantageous to correct a core during manufacture of a mold for manufacturing a lens.

A radius of curvature of the first surface 150a of the reflective lens 150 and a radius of curvature of the second surface 150b may be identical to each other. Accordingly, a see-through image may be seen without distortion and deterioration of optical performance.

At least one of the first reflective mirror 120 or the second reflective mirror 130 may be an asymmetrical aspherical lens. The first reflective mirror 120 and the second reflective mirror 130 may be configured such that an X-Z plane is asymmetrical with respect to the Y-axis a Y-Z plane is symmetrical with respect to the X-axis.

An optical assembly according to an embodiment may have four or more asymmetrical aspherical surfaces. For example, the first reflective mirror 120, the second reflective mirror 130, and the first surface 150a and the second surface 150b of the reflective lens 150 each may be asymmetrical aspherical surfaces. The refractive lens 140 may be a symmetrical aspherical lens. To reduce the size of the electronic apparatus 100A, each of the asymmetrical aspherical surfaces may be located on an off-axis with respect to the optical axis from the user's eye.

A stop ST may be further provided in a first direction from the reflective lens 150 to the user's eye.

The aspherical surface used in the optical assembly according to various embodiments may be defined as follows.

In an aspherical shape, when an optical axis direction is a Z-axis and directions perpendicular to the optical axis direction are an X-axis and a Y-axis, z denotes sag of a surface parallel to the Z-axis, k denotes a conic constant, c denotes a reciprocal 1/R of a radius of curvature at an apex of a lens, and Cj denotes an aspherical coefficient of a monomial $x^m y^n$.

$$z = \frac{cr^2}{1 + \sqrt{1-(1+k)c^2r^2}} + \sum_{j=2}^{66} C_j x^m y^n \qquad \text{<Equation 1>}$$

$$j = \frac{(m+n)^2 + m + 3n}{2} + 1$$

In the electronic apparatus 100 according to various embodiments, an image output from the display module may be sequentially pass, along the optical axis, though the first reflective mirror 120, the second reflective mirror 130, the refractive lens 140, and the reflective lens 150, to be projected to a user's retina. The electronic apparatus 100 according to various embodiments is configured to be binocular so that images output from the display module are respectively projected to the left eye and the right eye. The positions of images may be adjusted through position adjustment of the left eye and the right eye. An external real object may be seen to the user's eye by passing through the reflective lens 150.

In the optical assembly according to various embodiments, a straight distance T3 between the center of an entrance pupil and the center of the display module may have a range that 27 mm<T3<35 mm. When T3 is less than the lower limit of the above range, and a user wears the electronic apparatus, the electronic apparatus may interfere with a user's forehead, and a problem with the use thereof may be generated due to heating of the display module. When T3 exceeds the upper limit of the range, the electronic apparatus is located far away from the user's forehead, and thus the overall size of the apparatus may be increased.

The optical assembly according to various embodiments may satisfy the following inequality.

$$1.8 < (M1_{EFY})/EF_Y < 2.2 \qquad \text{<Inequality 2>}$$

In the above formula, $M1_{EFY}$ denotes a focal length of the first reflective mirror, and $EF_Y$ denotes a focal length in the Y-axis of the optical assembly.

When the power of the first reflective mirror 120 is great in the overall power of an optical assembly, it may be easy to make a viewing angle, or a field of view (FOV), of the optical assembly to be great. When $(M1_{EFY})/EF_Y$ exceeds the lower limit of Inequality 2, in the entire optical assembly, the power taken by the first reflective mirror is too large, and thus aberration control may be difficult. When the upper limit is exceeded, in the entire optical assembly, the power taken by the first reflective mirror is too small, and thus the viewing angle of the optical assembly decreases so that it is difficult to obtain a wide angle.

The optical assembly according to various embodiments may satisfy the following inequality.

$$19 \text{ deg} < M1_{tilt} < 23 \text{ deg} \qquad \text{<Inequality 3>}$$

In the inequality, $M1_{tilt}$ denotes a tilt angle of the first reflective mirror 120 with respect to the X-axis in the X-Z plane.

When $M1_{tilt}$ exceeds the lower limit of Inequality 3, second reflective mirror, refractive lens, a luminous flux incident on an eye through the reflective lens is highly likely to be blocked. When the upper limit is exceeded, a position distortion value of a real image is increased when the real image outside the optical assembly is seen in a see=through manner (real image).

The optical assembly according to various embodiments may satisfy the following inequality.

$$0.997 < EF_Y/EF_X < 1.003 \qquad \text{<Inequality 4>}$$

$EF_Y$ denotes a focal length in the Y-axis of the optical assembly, and $EF_X$ denotes a focal length in the X-axis of the optical assembly.

Inequality 4 shows a condition to maintain an aspect ratio of a virtual image from the display module 110. When $(EF_Y/EF_X)$ does not satisfy a range of Inequality 4, a distortion may occur.

An embodiment according to various designs is described below.

In each embodiment, surface numbers 1, 2, 3 . . . , n, where n is a natural number, are sequentially given in a row from a position close to the user's eye to a position close to the display module 10. $EF_Y$ denotes a focal length in the Y-axis of the optical assembly, FNO denotes an F number, 2w denotes a viewing angle, ImgH denotes an image height, R denotes a radius of curvature, Dn denotes a thickness of a lens (or a mirror), or an air space between a lens (or a mirror) and a lens (or a mirror), Nd denotes a refractive index, and Vd denotes an Abbe number. ST denotes a stop, and OBJ denotes an object.

Embodiment 1 f; 9.5667 FNO; 1.19 2w; 35 ImgH; 3.011

TABLE 1

| Surface | R | DN | Nd | Vd |
|---|---|---|---|---|
| OBJ: | INFINITY | INFINITY | | |
| ST: | INFINITY | 54.6 | | |
| 2: | −30.65 | −12.19 | | |
| C1: −2.13E+00 C4: 4.70E−03 C6: 4.54E−03 C8: 7.55E−05 C10: 7.25E−05 C11: −9.33E−06 C13: −1.51E−05 C15: −8.16E−06 C17: −7.73E−09 C19: 3.59E−08 C21: −5.95E−08 C22: 2.45E−08 C24: 1.50E−08 C26: 9.37E−09 C28: 7.63E−09 C30: 3.33E−10 C32: 4.69E−10 C34: 1.15E−09 C36: 9.40E−10 C37: −7.36E−11 C39: −5.19E−11 C41: −5.62E−11 C43: −7.32E−11 C45: −8.44E−11 C47: −5.97E−13 C49: −1.00E−12 C51: −4.06E−12 C53: −6.51E−12 C55: −3.72E−12 C56: 8.05E−14 C58: 5.86E−14 C60: 1.07E−13 C62: 2.01E−13 C64: 3.72E−13 C66: 3.65E−13 | | | | |
| 3: | −2404.87 | −0.98 | 1.635505 | 23.9 |
| A: 0.204599E−04 B: −.322376E−06 C: 0.000000E+00 D: 0.000000E+00 | | | | |
| 4: | −4717.82 | −10.47 | | |
| A: 0.314060E−04 B: −.256746E−06 C: 0.000000E+00 D: 0.000000E+00 | | | | |
| 5: | −13.75 | 22.29 | | |
| C1: 1.49E−01 C4: 4.03E−03 C6: 2.31E−02 C8: −2.39E−03 C10: −1.62E−03 C11: −5.95E−04 C13: −3.68E−04 C15: −1.44E−04 C17: −1.33−04 C19: −9.80E−05 C21: −1.52E−05 C22: 1.17E−05 C24: −4.52E−05 C26: −3.00E−05 C28: −3.12E−06 C30: 8.01E−07 C32: −1.18E−05 C34: −6.11E−06 C36: −7.17E−07 C37: −9.23E−07 C39: −1.05E−06 C41: −2.26E−06 C43: −5.76E−07 C45: −4.56E−08 C47: −3.77E−07 C49: −3.21E−07 C51: −2.25E−07 C53: −1.39E−08 C55: 3.05E−09 C56: −7.73E−09 C58: −4.94E−08 C60: −1.97E−08 C62: −8.86E−09 C64: 6.19E−10 C66: 3.32E−10 | | | | |
| 6: | −23.76 | −21.90 | | |
| C1: −2.08E−01 C4: 2.12E−03 C6: 3.44E−03 C8: 3.04E−05 C10: 1.93E−05 C11: 4.74E−07 C13: 1.71E−06 C15: 1.52E−06 C17: 3.21E−08 C19: 8.32E−08 C21: 3.30E−08 C22: 3.70E−10 C24: 4.81E−09 C26: 4.20E−09 C28: 1.59E−09 C30: 1.06E−10 C32: −2.17E−11 C34: −1.15E−10 C36: −3.89E−11 C37: 5.45E−13 C39: −2.43E−11 C41: −1.77E−11 C43: −5.55E−12 C45: −1.66E−12 C47: −9.92E−14 C49: 5.94E−13 C51: 1.61E−12 C53: 9.96E−13 C55: 2.67E−13 C56: −6.70E−15 C58: 5.73E−14 C60: 7.20E−14 C62: 1.81E−14 C64: 1.06E−14 C66: 1.97E−15 | | | | |
| IMG | INFINITY | −0.89 | | |

A value about a condition range in the above embodiment is shown below.

TABLE 2

| Condition | Embodiment |
|---|---|
| 27 mm < T3 < 35 mm | 30.45 |
| 1.8 < (M1$_{EFY}$)/EF$_Y$ < 2.2 | 2.06 |
| 19 deg < M1$_{tilt}$ < 23 deg | 21.73 |
| 0.997 < EF$_Y$/EF$_X$ < 1.003 | 1 |

The optical assembly according to various embodiments may be employed in an electronic apparatus and may provide good quality images. The electronic apparatus may include an optical see-through lens that overlaps an image with a user's real world view. The electronic apparatus may be, for example, a display device. The electronic apparatus may be, for example, a head mounted display. The head mounted display may be in the form of a helmet, a visor, glasses, and a goggle, or may be attached by one or more straps. The head mounted display may be used for aeronautics, engineering, science, medicine, computer games, videos, sports, training, simulations, and various applications. The electronic apparatus according to various embodiments may be applied to mobile devices, virtual reality devices, augmented reality devices, surround view input devices for vehicles, unmanned mobile device vision systems, imaging devices for driving of a vehicle, and the like mobile.

Figure 7:
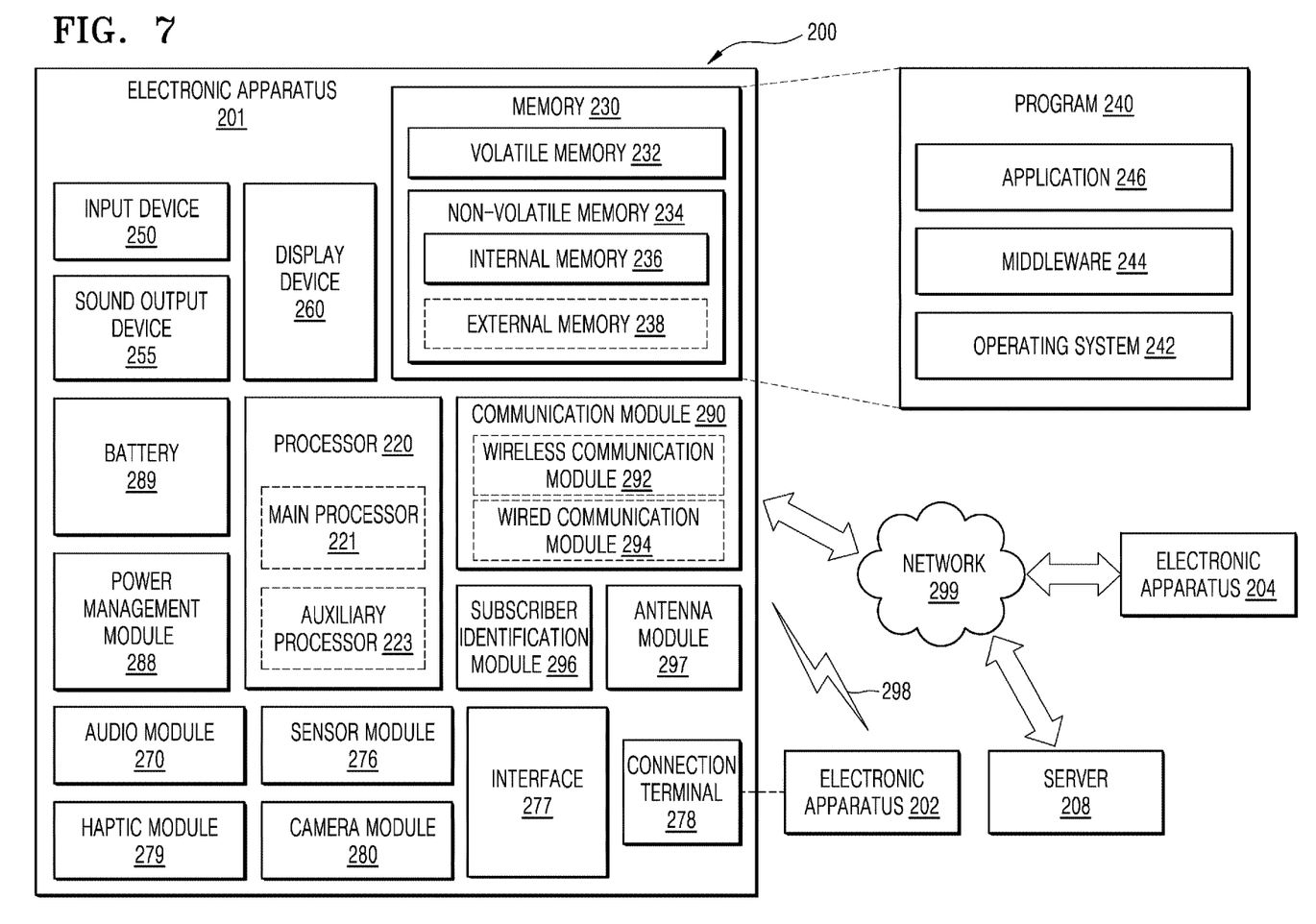
FIG. 7 is a block diagram of an electronic apparatus in a network environment, according to various embodiments.

FIG. 7 is a block diagram of the electronic apparatus 201, e.g., the electronic apparatus 100, in a network environment 200, according to various embodiments. The electronic apparatus 100 of FIG. 1 may be applied to the network environment 200. Referring to FIG. 7, in the network environment 200, the electronic apparatus 201 may communicate with an electronic apparatus 202 via a first network 298, e.g., a short-range wireless communication, or communicate with an electronic apparatus 204 or a server 208 via a second network 299, e.g., a remote wireless communication. According to an embodiment, the electronic apparatus 201 may communicate with the electronic apparatus 204 via the server 208. According to an embodiment, the electronic apparatus 201 may include the processor 220, a memory 230, an input device 250, a sound output device 255, a display device 260, an audio module 270, a sensor module 276, an interface 277, a haptic module 279, a camera module 280, a power management module 288, a battery 289, a communication module 290, a subscriber identification module 296, and an antenna module 297. In some embodiment, in the electronic apparatus 201, at least one of constituent elements, e.g., the display device 260 or the camera module 280, may be omitted or other constituent element may be added. In some embodiment, like the sensor module 276, e.g., a fingerprint sensor, an iris sensor, or an illuminance sensor, embedded in the display device 260, e.g., a head mounted display, some constituent elements may be implemented by being integrated.

The processor 220 may control at least one of other constituent elements, for example, hardware or software constituent element, of the electronic apparatus 201 connected to the processor 220 by executing, for example, software such as a program 240, and perform various pieces of data processing or operations. The processor 220 may load instructions or data received from other constituent elements, for example, the sensor module 276 or the communication module 290, on a volatile memory 232, process the instructions or data stored in the volatile memory 232, and store result data in a non-volatile memory 234. According to an embodiment, the processor 220 may include a main processor 221, for example, a central processing device or an application processor, and an auxiliary processor 223, for example, a graphics processing device, an image signal processor, a sensor hub processor, or a communication processor, which may be operated independently or altogether. Additionally or alternatively, the auxiliary processor 223 may be configured to use less power than the main processor 221, or to be specified to a designated function. The auxiliary processor 223 may be implemented separately from or embedded in the main processor 221.

In this case, the auxiliary processor 223 may control at least some of functions or states related to at least one of constituent elements of the electronic apparatus 201, for example, the display device 260, the sensor module 276, or the communication module 290, for example, instead of the main processor 221 when the main processor 221 is in an inactive state, for example, a sleep state, or with the main processor 221 when the main processor 221 is in an active state, for example, an application execution state. According to an embodiment, the auxiliary processor 223, for example, an image signal processor or a communication processor, may be implemented as a part of other functionally related constituent elements, for example, the camera module 280 or the communication module 290. The memory 230 may store various pieces of data used by at least one of constituent element of the electronic apparatus 201, for example, the processor 220 or the sensor module 276. The data may include, for example, software such as the program 240 and input data or output data regarding instructions related thereto. The memory 230 may include the volatile memory 232 or the non-volatile memory 234.

The program 240 may be stored as software in the memory 230 and may include, for example, an operating system 242, a middleware 244, or an application 246.

The input device 250 may receive instructions or data used for the constituent element of the electronic apparatus 201, for example, the processor 220, from the outside of the electronic apparatus 201, for example, from a user. The input device 250 may include, for example, a microphone, a mouse, or a keyboard.

The sound output device 255 may output a sound signal to the outside of the electronic apparatus 201. The sound output device 255 may include, for example, a speaker or a receiver. A speaker may be used for a general purpose such as multimedia reproduction or recording reproduction, and a receiver may be used for receiving an incoming call. According to an embodiment, the receiver may be implemented separated from or as a part of the speaker.

The display device 260 may visually provide information to the outside of the electronic apparatus 201, for example, to a user. The display device 260 may include, for example, a display, a hologram device, or a projector, and a control circuit for control any of the devices. According to an embodiment, the display device 260 may include a touch circuitry configured to sense a touch, or a sensor circuit, for example, a pressure sensor, configured to measure the strength of a force generated by the touch.

The audio module 270 may convert sound to an electrical signal or reversely an electrical signal to sound. According to an embodiment, the audio module 270 may obtain sound through the input device 250 or output sound through the sound output device 255 or an external electronic apparatus, for example, the electronic apparatus 202 such as a speaker or a headphone, directly or wirelessly connected to the electronic apparatus 201.

The sensor module 276 may generate an operating state, for example, power or temperature, of the electronic apparatus 201, or an electrical signal or a data value corresponding to an external environment. The sensor module 276 may include, for example, a gesture sensor, a gyro sensor, a barometric pressure sensor, a magnetic sensor, an acceleration sensor, a grip sensor, a proximity sensor, a color sensor, an infrared (IR) sensor, a biological sensor, a temperature sensor, a humidity sensor, or an illuminance sensor.

The interface 277 may support one or more designated protocols to be used for the electronic apparatus 201 to directly or wirelessly connect to the external electronic apparatus, for example, the electronic apparatus 202. According to an embodiment, the interface 277 may include, for example, a high definition multimedia interface (HDMI), a universal serial bus (USB) interface, an SD card interface, or an audio interface.

A connection terminal 278 may include a connector through which the electronic apparatus 201 is physically connected to the external electronic apparatus, for example, the electronic apparatus 202. The connection terminal 278 may include, for example, an HDMI connector, a USB connector, an SD card connector, or an audio connector, for example, a headphone connector.

The haptic module 279 may convert an electrical signal to a mechanical stimulus, for example, a vibration or a movement, which may be recognized by a user through a tactile sense or a sense of movement, or to an electrical stimulus. The haptic module 279 may include, for example, a motor, a piezoelectric device, or an electrical stimulation device.

The camera module 280 may photograph a still image and a video. According to an embodiment, the camera module 280 may include one or more lenses, image sensors, image signal processors, or flashes.

The power management module 288 may manage electric power supplied to the electronic apparatus 201 According to an embodiment, the power management module 288 may be implemented as, for example, at least a part of a power management integrated circuit (PMIC).

The battery 289 may supply electric power to at least one of the constituent elements of the electronic apparatus 201. According to an embodiment, the battery 289 may include, for example, non-rechargeable primary cells, rechargeable secondary cells, or fuel cells.

The communication module 290 may establish a direct communication channel, for example, a wired communication channel, or a wireless communication channel between the electronic apparatus 201 and the external electronic apparatus, for example, the electronic apparatus 202, the electronic apparatus 204, or the server 208, and support a communication through the established communication channel. The communication module 290 may include one or more communication processors that are independently operated of the processor 220, for example, an application processor, and support a direct communication, for example, a wired communication, or a wireless communication. According to an embodiment, the communication module 290 may include a wireless communication module 292, for example, a cellular communication module, a short-range wireless communication module, or a global navigation satellite system (GNSS) communication module, or a wired communication module 294, for example, a LAN communication module, or a power line communication module. Any corresponding communication module of the communication modules may communicate with the external electronic apparatus through the first network 298, for example, a short-range communication network such as Bluetooth, WiFi direct, or infrared data association (IrDA), or the second network 299, for example, a long-range communication network such as a cellular network, the Internet, or a computer network such as LAN or WAN. These various types of communication modules may be implemented by being integrated into one constituent element, for example, a single chip, or as a plurality of separate constituent elements, for example, a plurality of chips.

According to an embodiment, the wireless communication module 292 may identify and approve the electronic apparatus 201 in a communication network such as the first network 298 or the second network 299 by using user information stored in the subscriber identification module 296.

The antenna module 297 may include one or more antennas to transmit a signal or power to the outside, or receive the same from the outside. According to an embodiment, the communication module 290, e.g., the wireless communication module 292, may to transmit a signal to an external electric apparatus or receive the same from the external electronic apparatus through an antenna suitable for a communication method.

At least some of the constituent elements may be mutually connected to each other through a communication method between peripheral devices, for example, a bus, a general-purpose input and output (GPIO), a serial peripheral interface (SPI), or a mobile industry processor interface (MIPI), and exchange signals, for example, instructions or data therebetween.

According to an embodiment, the instructions or data may be transmitted or receive between the electronic apparatus 201 and the electronic apparatus 204 at the outside via the server 208 connected to the second network 299. The electronic apparatuses 202 and 204 each may be apparatuses that are the same as or different from the electronic apparatus 201. According to an embodiment, all or some of the operations performed in the electronic apparatus 201 may be performed in one or more external apparatuses of the external electronic apparatuses such as the electronic apparatuses 202 and 204 or the server 208. According to an embodiment, when the electronic apparatus 201 is supposed to perform a function or a service automatically or in response to a request from a user or another apparatus, the electronic apparatus 201 may request one or more external electronic apparatuses to perform at least part of the function or the service, rather than performing the function or the service, or in addition thereto. The external electronic apparatus having received the request may perform at least part of the requested function or service, or an additional function or service related to the request, and transmit a result of the performance to the electronic apparatus 201. The electronic apparatus 201 may process the result, as it is or additionally, and provide the result as at least part of a response to the request. To this end, for example, cloud computing, distributed computing, or client-server computing technologies may be used.

While this disclosure has been particularly shown and described with reference to preferred embodiments thereof, it will be understood by those of ordinary skill in the art that various changes in form and details may be made therein without departing from the spirit and scope of the disclosure as defined by the appended claims. The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

The invention claimed is:

1. An optical assembly comprising:
   a first reflective mirror configured to reflect image light output from a display module;
   a second reflective mirror configured to reflect the image light reflected from the first reflective mirror;
   a refractive lens configured to allow the image light reflected from the second reflective mirror to pass therethrough; and
   a reflective lens having a first surface and a second surface, each of the first surface and the second surface having an asymmetrical aspherical shape, and the reflective lens including a transflective coating layer provided on the first surface and configured to reflect the image light that passed through the refractive lens in a first direction and to transmit real light from a second direction facing the first direction,
   wherein a straight distance T3 between a center of an entrance pupil and a center of the display module of the optical assembly is in a range that 27 mm<T3<35 mm.

2. The optical assembly of claim 1, wherein an anti-reflection coating layer is further provided on the second surface of the reflective lens.

3. The optical assembly of claim 1, wherein the first surface and the second surface of the reflective lens have a same radius of curvature.

4. The optical assembly of claim 1, wherein the first reflective mirror has an asymmetrical aspherical shape.

5. The optical assembly of claim 1, wherein the second reflective mirror has an asymmetrical aspherical shape.

6. The optical assembly of claim 1, wherein each of the first reflective mirror and the second reflective mirror has an asymmetrical aspherical shape.

7. The optical assembly of claim 1, wherein the optical assembly has four or more asymmetrical aspherical surfaces.

8. The optical assembly of claim 7, wherein, when an axis perpendicular to the display module is a Z-axis and two axes perpendicular to the Z-axis are an X-axis and a Y-axis, the four or more asymmetrical aspherical surfaces are configured such that an X-Z plane is asymmetrical with respect to the Y-axis and a Y-Z plane is symmetrical with respect to the X-axis.

9. The optical assembly of claim 1, wherein a stop is further provided in the first direction from the reflective lens.

10. An optical assembly comprising:
    a first reflective mirror configured to reflect image light output from a display module;
    a second reflective mirror configured to reflect the image light reflected from the first reflective mirror;
    a refractive lens configured to allow the image light reflected from the second reflective mirror to pass therethrough; and
    a reflective lens having a first surface and a second surface, each of the first surface and the second surface having an asymmetrical aspherical shape, and the reflective lens including a transflective coating layer provided on the first surface and configured to reflect the image light that passed through the refractive lens in a first direction and to transmit real light from a second direction facing the first direction,
    satisfying a following inequality:

$$1.8<(M1_{EFY})/EF_Y<2.2, \qquad \text{<Inequality>}$$

wherein $M1_{EFY}$ denotes a focal length of the first reflective mirror, and $EF_Y$ denotes a focal length in Y-axis of the optical assembly.

11. The optical assembly of claim 1, satisfying a following inequality:

$$19 \text{ deg} < M1_{tilt} < 23 \text{ deg}, \qquad \text{<Inequality>}$$

wherein $M1_{tilt}$ denotes a tilt angle of the first reflective mirror with respect to X-axis in X-Z plane.

12. The optical assembly of claim 1, satisfying a following inequality:

$$0.997 < EF_Y/EF_X < 1.003, \qquad \text{<Inequality>}$$

wherein $EF_Y$ denotes a focal length in Y-axis of the optical assembly, and $EF_X$ denotes a focal length in X-axis of the optical assembly.

13. An electronic apparatus comprising:
    a housing;
    a display module mounted on one surface of the housing;
    a first reflective mirror configured to reflect image light output from the display module and arranged to face the display module;

a second reflective mirror configured to reflect the image light reflected from the first reflective mirror and arranged below the display module;

a refractive lens arranged to allow the image light reflected from the second reflective mirror to pass therethrough; and a reflective lens configured to reflect the image light that passed through the refractive lens in a user's eye direction and having a transflective coating layer configured to transmit external real light, wherein one or more of both surfaces have an asymmetrical aspherical shape, wherein the refractive lens is arranged from a lower end portion of the first reflective mirror to a lower end portion of the second reflective mirror, and the reflective lens is arranged below the refractive lens.

14. The electronic apparatus of claim 13, further comprising a cover arranged to cover the first reflective mirror and the reflective lens.

* * * * *